United States Patent [19]

Koike et al.

[11] Patent Number: 4,779,256
[45] Date of Patent: Oct. 18, 1988

[54] APPARATUS FOR DETECTING DEVIATIONS FROM A MUTUALLY PERPENDICULAR CONDITION BETWEEN A DISC AND A LIGHT BEAM

[75] Inventors: Shigeaki Koike; Akio Yamakawa, both of Kanagawa, Japan

[73] Assignee: Sony Corporation, Tokyo, Japan

[21] Appl. No.: 910,522

[22] Filed: Sep. 23, 1986

[30] Foreign Application Priority Data

Sep. 24, 1985 [JP] Japan ................... 60-208787

[51] Int. Cl.$^4$ .................... G11B 7/00; G01J 1/20
[52] U.S. Cl. ...................... 369/46; 250/201; 356/153; 313/512
[58] Field of Search ............... 356/152, 153; 250/557, 250/201 DF, 561, 239; 369/44-46, 120, 33, 41; 313/499, 512; 357/72, 74

[56] References Cited

U.S. PATENT DOCUMENTS

| | | | |
|---|---|---|---|
| 3,396,281 | 8/1968 | Blackman | 250/239 |
| 3,805,347 | 4/1974 | Collins et al. | 313/499 X |
| 3,979,588 | 9/1976 | Park | 369/33 X |
| 4,253,723 | 3/1981 | Kojima et al. | 369/120 X |
| 4,356,392 | 10/1982 | Wottekoek et al. | 350/561 X |
| 4,607,357 | 8/1986 | Okano | 369/46 E X |
| 4,674,078 | 6/1987 | Otsuka et al. | 369/44 |
| 4,680,244 | 7/1987 | Kanamaru | 369/46 X |

Primary Examiner—Aristotelis M. Psitos
Attorney, Agent, or Firm—Lewis H. Eslinger; Jay H. Maioli

[57] ABSTRACT

A compact skew or skewness detector conventiently applicable for an optical information reproducing apparatus and so forth. The skew detector includes a light source and at least a pair of photo sensors arranged side-by-side with the light source. A transparent detector housing houses the light source and photo sensors. The detector housing is provided with a deflector section for deflecting the light from the light source in such a manner that an annular or circular image of the light reflected from the surface of the object about which the skewness is to be detected is formed around the light source.

30 Claims, 4 Drawing Sheets

APPARATUS FOR DETECTING DEVIATIONS FROM A MUTUALLY PERPENDICULAR CONDITION BETWEEN A DISC AND A LIGHT BEAM

BACKGROUND OF THE INVENTION

1. Field of the Invention

The present invention relates generally to a skewness detector for detecting the skewness of an object with respect to a predetermined orientation. More specifically, the invention relates to a reflection-type skewness detector for use in optical disk players, optical video disk players, compact disk players and the like. More particularly, the invention relates to a skewness detector compact enough to be installed in an optical block of an optical disk player or the like.

2. Description of the Prior Art

Generally, in an optical disk reproducing apparatus, a laser beam is focussed onto the recording surface of an optical disk by an objective lens so as to reproduce a signal recorded thereon. In this case, resolution is determined by how much area the laser beam covers, or the diameter of the beam spot. Accordingly, the maximum value of the diameter of the beam spot is designed to be less than a specified value. The diameter of the beam spot is determined by the number of wavelengths the laser light travels from its source and the ratio between the focal length of the objective lens and its diameter. The ratio between the focal length of an objective lens and the diameter of the lens is generally represented by a "numerical aperture (NA) value". Conventional helium-neon lasers used as the light source in optical disk players, make the optical disk player bulky and relatively expensive. Accordingly, it is a recent tendency to use semiconductor lasers as the light source because they are more inexpensive than helium-neon lasers and thus help make the apparatus more compact. However, semiconductor lasers exhibit a wavelength of 780 nm which is longer than that of the helium-neon laser, i.e. 623.8 nm. For this reason, in order to limit the diameter of beam spot of the semiconductor laser so as to provide the same resolution as that of a helium-neon laser, the NA value of the objective lens must be increased to, for example, about 0.5.

However, when the NA value of the objective lens is increased as set forth above, if the optical axis of the laser beam is not precisely perpendicular to the recording surface of the optical disk, crosstalk from adjacent tracks on the disk can become a serious problem.

In order to eliminate or significantly reduce crosstalk in reproduction of the optical disk, there has been proposed a servo mechanism for an optical head block for adjusting the optical axis to precise perpendicularity with the recording surface of the optical disk. This servo mechanism employs a skew detector for detecting the relative skew between the recording surface of the optical disk and the optical head.

Recently, various head-block-mounted skew detectors have been proposed for monitoring relative skew between the disk and the optical head block. For example, in one typical skew detector, a diffused light source comprises a lamp and a diffusion plate. The diffusion plate is formed as a window of quadrilateral shape and the periphery of the window is masked by a light shielding portion. A light receiving device receives the light emitted by the diffusion light source and reflected by the disk. The light receiving device comprises a cylindrical member, a multi-element photo detector disposed in the floor of the cylindrical member, and a condenser lens supported by the cylindrical member between the photo detector and the recording surface of the disk. The diffused light source and the light receiving device are aligned along an axis perpendicular to the desired plane of the disk. Since the radial skewness of the disk is to be detected, the diffused light source and the light receiving device are aligned perpendicular to the radii of the disk. The diffused light source and the light receiving device are arranged such that the light receiving device receives an asymmetrical reflection from the recording surface of the disk if the disk is at all oblique or skewed.

This type of skew detector is too bulky to be installed in optical head blocks. This space problem may be resolved by employing the skew detector disclosed in the Japanese Patent First Publication (Tokkai) Showa (Appln. 58-140139), in which the diffused light source and the light receiving device are housed within a single cylindrical housing. The housing also supports a lens. The diffused light source and the lens are so arranged as to focus the light reflected by the recording surface of the optical disk onto the light receiving device. The light receiving device comprises a pair of light sensitive components so that light image can be formed on the pair of light sensitive components of the light receiving device. If the optical disk is skewed or deformed, the image formed on the light sensitive components will be shifted so that part of the image will not fall on the light sensitive components. The light sensitive components are adapted to produce an electric signal proportional to the amount of the light received. Therefore, when the disk is skewed or deformed, the signal values of the pair of light sensitive component will differ. This difference represents the skewness of the disk.

However, in this arrangement, since the diffused light source and the light receiving device are offset from the optical axis of the lens, the distance between the lens and the optical disk influences its detection characteristics. This, in turn, means that the components of the detector must all be fabricated with low tolerances and that assembly must also be highly accurate.

SUMMARY OF THE INVENTION

Therefore, it is an object of the present invention to provide a skew detector which can resolve the defects or drawbacks in the prior art as set forth above.

Another and more specific object of the present invention is to provide a skew detector applicable to optical disk players and the like, which require compactness and low weight.

A further object of the invention is to provide a skew detector which can accurately detect skewness without requiring highly accurate detector elements or assembly.

In order to accomplish the aforementioned and other objects, a skew detector according to the invention includes a light source and at least a pair of photo sensors arranged side-by-side with the light source. A transparent detector housing houses the light source and photo sensors. The detector housing is provided with a deflector section for deflecting the light from the light source in such a manner that an annular image of the light reflected from the surface of the object about which the skewness is to be detected is formed around the light source.

In the preferred embodiment, at least a pair of photo sensors are arranged in symmetrical positions about the light source, so that the annular reflected image extends over the photo sensors when the object is not skewed. Skewness of the object may be detected by detecting an offset of the annular reflected light image at the photo sensors.

According to one aspect of the invention, a reflection-type skewness detector for detecting the skewness of an object comprises a diffused light source, a pair of photo detectors arranged on both sides of the diffused light source, the diffused light source and the pair of photo detectors being mounted on a common base, and a transparent protector covering the base, an upper portion of the transparent protector having a curved surface refracting the light emitted by the diffused light source into a bundle closely resembling parallel light whereby the light emitted by the light source and reflected from the object is directed to the photo detectors through the upper portion of the transparent protector and the difference between the amounts of light detected by the two photo detectors represents the skewness of the object.

The skewness detector according to one spect of the present invention as set forth in adapted to detect skewness of the object which has a substantially flat, light-reflective surface which, when not skewed, lies perpendicular to the optical axis of the skewness detector.

Preferably, the pair of photo detectors are arranged radially symmetrically about the diffused light source.

The transparent protector is designed to form a substantially circular reflected light image around the diffused light source, the circular reflected light image being shifted relative to the diffused light source to an extent related to the skewness of the object. The photo detectors are arranged around the diffused light source so as to receive equal amounts of light when the object is in a desired normal position in which it is not skewed. Further, it is preferable that the transparent protector is made of a synthetic resin by molding.

Particularly, the skewness detector is adapted to detect skew of the object which is an optical disk having a recording surface containing information recorded on tracks, which recording surface serves as the light-reflecting surface.

According to another aspect of the invention, a reflection-type skewness detector for detecting the skewness of an object with respect to a desired normal orientation, which skewness detector comprises a detector base, a diffused light source mounted on the detector base and emitting diffused light toward the opposing surface of the object, refracting means interposed between the diffused light source and the surface of the object for refracting the diffused light emitted by the diffused light source into a parallel light flux directed toward the surface of the object, the refracting means further refracting light flux reflected by the surface so as to form a circular light image around the diffused light source, the light image being centered at the center of the diffused light source as long as the object is in the normal orientation, the center of the light image being offset to an extent corresponding to the skewness of the object relative to the normal orientation, and photo detector means mounted on the base and arranged around the diffused light source for measuring the offset of the center of the light image and producing a detector signal indicative of the extent of skewness of the object relative to the normal orientation.

The photo detector means comprises a plurality of photo detectors arranged, equidistantly around the diffused light source. The photo detectors are arranged to receive equal amounts of reflected light while the object is in the normal orientation.

In the preferred construction, the refracting means comprises a transparent light refractive member the optical axis of which is essentially perpendicular to the surface of the object. The refractive member also serves as a detector housing for the diffused light source and the photo detector means. The detector hosuing is made of a transparent synthetic resin. The photo detector means comprises a plurality of photo detectors arranged equidistant around the diffused light source. The photo detectors are preferably arranged to receive equal amounts of reflected light while the object is in the normal orientation. Further preferably, the photo detectors are arranged radially symmetrically about the diffused light source.

In accordance with a further aspect of the invention, a skewness detector is applicable for an optical information reproducing apparatus for reproducing information recorded on a recording surface of a disk-shaped recording medium, which apparatus includes an optical pick-up device mounted on a tiltable optical head block and having an optical axis, a laser beam source for transmitting a laser beam directed along the optical axis toward the recording surface and thereby reading the recorded information, a skewness detector mounted on the tiltable optical head block for detecting the skewness of the recording medium, and a skewness corrector controlled by the output of the skewness detector for controlling the optical head block so that the optical axis of the pick-up device is held perpendicular to the recording surface. The skewness detector comprises a diffused light source, a pair of photo detectors arranged on both sides of the diffused light source, the diffused light source and the pair of photo detectors being mounted on a common base, and a transparent protector covering the base, an upper portion of the transparent protector having a curved surface refracting the light emitted by the diffused light source into a bundle closely resembling parallel light whereby the light emitted by the light source and reflected from the object is directed to the photo detectors through the upper portion of the transparent protector and the difference between the amounts of light detected by the two photo detectors represents the skewness of the object.

According to a still further aspect of the invention, an optical information reproducing apparatus for reproducing information recorded on a recording surface of a disk-shaped recording medium, comprises an optical pick-up device mounted on a tiltable optical head block and having an optical axis, a laser beam source for transmitting a laser beam along the optical axis toward the recording surface and thereby reading the recorded information, a skewness detector for detecting the skewness of the recording medium with respect to desired normal orientation thereof, which skewness detector includes a detector base; a diffused light source mounted on the detector base and emitting diffused light toward the opposing surface of the object; refracting means interposed between the diffused light source and the surface of the object for refracting the diffused light emitted by the diffused light source into a parallel light flux directed toward the surface of the object, the refracting means further refracting light flux reflected by the surface so as to form a circular light image around the diffused light source, the light image being centered at the center of the diffused light source as long as the object is in the normal orientation, the center of the light image being offset to an extent corresponding to the skewness of the object relative to the normal orientation; photo detector means mounted on the base and arranged around said diffused light source for measuring the offset of said center of said light image and producing a detector signal indicative of the extent of skewness of said object relative to said normal orientation, and a servo mechanism for adjusting the angular position of said optical head block based on the output of said skewness detector so that the optical axis of said pick-up device is held perpendicular to said recording surface.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 5(A) to 5(C) show reflected light images received by photo sensors;

DESCRIPTION OF THE PREFERRED EMBODIMENT

Figure 1:
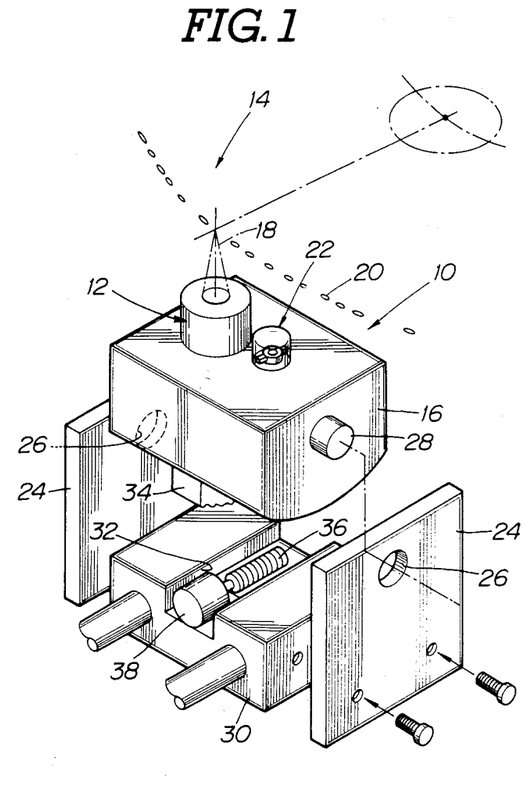
FIG. 1 is a perspective view of an optical head block on which the preferred embodiment of a skew detector according to the present invention is mounted.

Referring now to the drawings, FIG. 1 shows an optical head block 10 commonly used in optical disk players. The optical head block 10 carries an optical pick-up assembly 12 which reads the information recorded in an optical disk 14. The optical pick-up assembly 12 has a base 16 housing therein a conventional optical pick-up (not shown). The optical pick-up generates a laser beam 18 and focuses it on the recording surface of the optical disk 14 to allow information in the form of pits 20 on tracks in the recording surface to be read. The optical pick-up assembly 12 includes a biaxial servo mechanism for focusing control and tracking control for focusing the laser beam on the pits to be reproduced for and adjusting the radial position of the focal point in a per se well-known manner.

A skew detector assembly 22, also mounted on the base 16 of the optical pick-up assembly 12, serves to detect skewness of the optical disk 14 with respect to the optical pick-up assembly 12. The skew detector assembly 22 produces a skew indicative signal having a value representative of the skewness of the optical disk 16 relative to the optical pick-up assembly 22. The preferred embodiment of the skew detector 22 according to the invention will be described in detail later.

The optical head block 10 also has a pair of support walls 24. Openings 26 through both support walls 24 and near their upper edges receive pivot shafts 28 extending from the base 16 of the optical pick up assembly 12. Thus, the optical pick-up assembly 12 is pivotably suspended between the support walls 22. The lower edges of the support walls 24 are fixed to the side faces of a support base 30. The support base 30 has a groove 32 extending parallel to the support walls 24.

Figure 2:
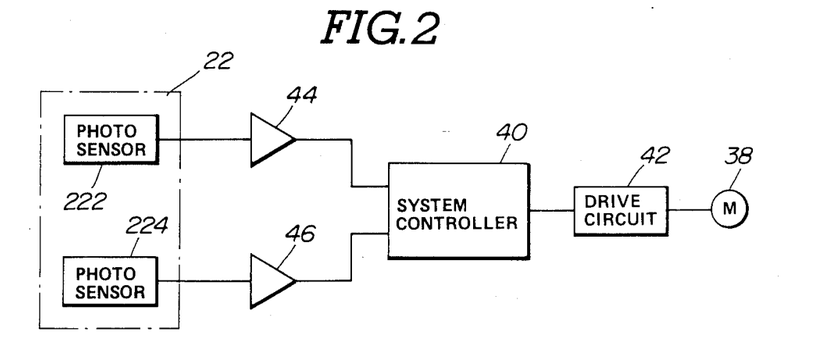
FIG. 2 is a block circuit diagram of the servomotor control feedback loop for the inclination drive of the optical head of FIG. 1.

A worm gear 34 projects downward from the lower surface of the base 16 of the optical pick-up assembly 12. The worm gear 34 engages a worm 36 driven by a servo motor 38. The servo motor 38 is controlled by a skew control signal from a system controller 40 which is shown in FIG. 2. In practice, the system controller 40 receives the skewness indicative signal and derives a control signal designed to reduce the skewness to zero. The control signal produced by the system controller 40 is sent to a driver circuit 42 to control the servo motor 38 to drive the worm 36. As a result, the base 16 of the optical pick-up assembly 12 is pivotted about the pivot shaft 28 so as to change its angular position to compensate for the skewness of the optical disk 14.

Figure 3:
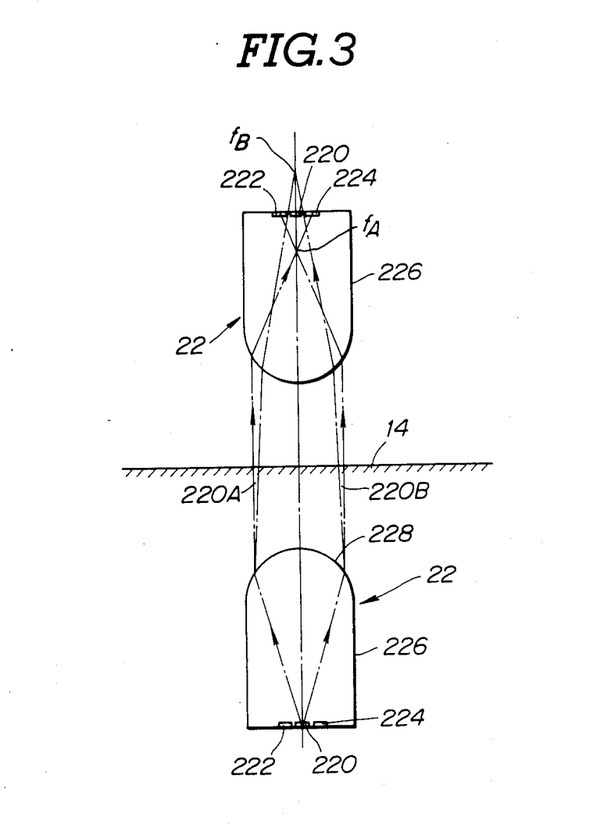
FIG. 3 is a diagram of the preferred embodiment of the skew detector of the invention, in which the upper half of the Figure shows a virtual image of the skew detector as reflected by the target surface.
Figure 4:
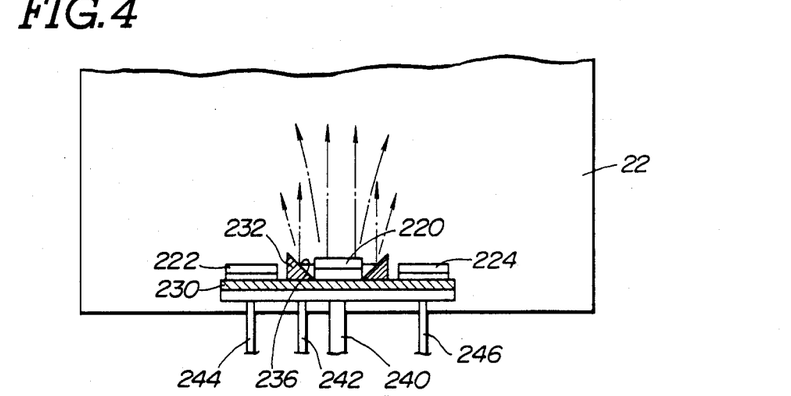
FIG. 4 is an enlarged front elevation of the skew detector assembly, in which a portion of a transparent detector housing is cut away.
Figure 5:
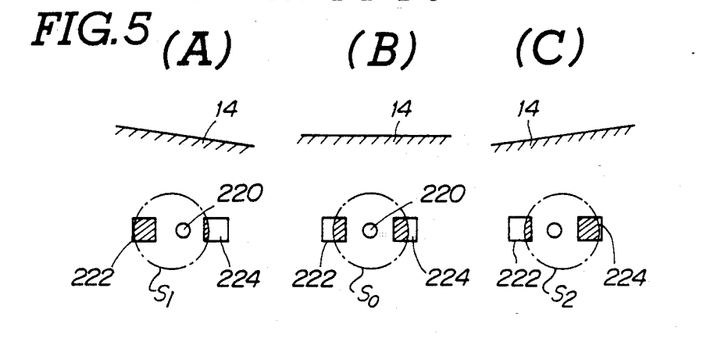

The preferred embodiment of the skew detector 22, according to the present invention, is illustrated in FIGS. 3 and 4. The skew detector 22 generally comprises a light source 220, a pair of photo sensors 222 and 224 and a detector housing 226. The detector housing 226 is made of a transparent resin such as an epoxy resin. The top portion of the detector housing 226 has a curved surface 228 with a curvature designed to focus emitted light in a given direction, as described below.

The light source 220 comprises a light-emitting diode or the like disposed near the center of the floor of the protecting member. The light source 220 transmits diffused light toward the recording surface of the optical disk 14. The photo sensors 222 and 224 comprise phototransistors or the like. The photo sensors 222 and 224 are symmetrically arranged on opposite sides of the light source 220. They are encapsulated by the detector housing 226, which is made of molded resin or the like. An electrical lead for the light-emitting diode and the photo-transistor is not shown.

FIG. 4 is an enlarged side view of a light source 220 and the photo sensors 222 and 224. As will be seen from FIG. 4, the light source 220 and the photo sensors 222 and 224 are mounted on a conductive disc-shaped board 230. An annular reflector 232 is arranged between the light source 220 and the photo sensors 222 and 224. The reflector 232 has a reflective surface 236 oblique to the upper plane of the disc-shaped board 230 for deflecting the diffused light emitted from the light source 220 toward the curved top portion of the detector housing 226.

A common electrode or lead 240 is fixedly connected to the disc shaped board 230. An electrode 242 is connected to a light-emitting diode serving as the light source 220 for power supply. Electrodes 244 and 246 are connected to photo-transistors or photo-diodes serving as the photo sensors 222 and 224 to conduct their outputs to the system controller 40 through amplifiers 44 and 46, as shown in FIG. 2.

The light source 220 and the photo sensors 222 and 224 can be fabricated using standard integrated circuit techniques using the conductive disc-shaped board 230 as a semiconductor substrate.

The operation of the preferred embodiment of the reflecting-type skew detector 22 according to the present invention is described below with reference to FIGS. 3 through 6.

Diffused light generated by applying a given voltage to the light source 220 propagates generally in the direction of the arrow, and slightly-diffused parallel beams represented by beams 220A, 220B are emitted.

The recording surface of the optical disk 14 acts as a mirror reflecting the diffused light from the light source. The reflected light can be expressed as light propagating along the arrows, so that the light passes through the detector housing 226 which is illustrated in a form of a mirror image in FIG. 3, impinges upon the photo sensors 222 and 224. In this case, the reflected light is as shown in the drawing so that the focus falls at points in front of and behind the photo sensors 222 and 224. Thus, the photo sensors 222 and 224 receive a circular reflected image S as shown in FIG. 5(b). If the recording surface of the optical disk 14 is not skewed, a reflected image SO centered on the light source 2 is formed. Therefore, equal amounts of light irradiate the photo sensors 222 and 224 on either side of the light source 2 as shown by the hatching in FIG. 5(b).

On the other hand, if the recording surface of the optical disk 14 is skewed relative to the optical pick-up assembly 12, reflected light from the detector housing 226 will fall on the photo sensors 222 and 224 with an angle of reflection twice that of the skewness $\theta$ of the recording surface. Therefore, the reflected light is offset from the center as shown by the reflected images $S_1$ or $S_2$ in FIGS. 5(a) and 5(c). Due to this offset of the reflected light image $S_1$ or $S_2$, the amount of light coming into the photo sensor 222 will differ from that received by the photo sensor 224.

Therefore, if the current outputted by the photo sensor 222 is labelled $i_1$ and the current outputted by the photo sensor 224 is labelled $i_2$, the skewness indicative value I can be calculated from the following equation:

$$I=(i_1-i_2)/(i_1+i_2)$$

Figure 6:
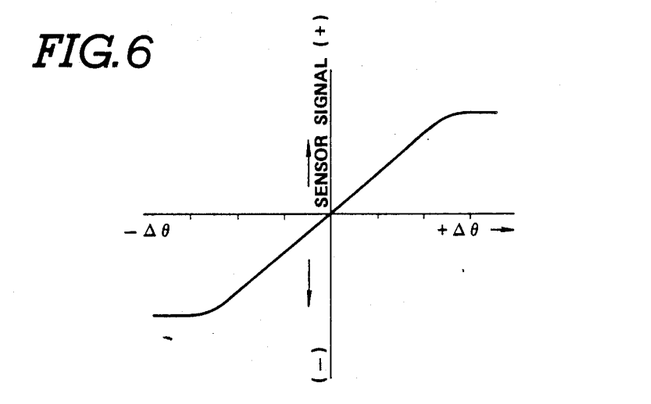
FIG. 6 is a graph of the relationship between the output of the photo sensors and target surface inclination.

The skewness indicative value I actuals represents the magnitude of offset of the reflected images S from the center. The relationship between the skewness magnitude indicative value I and the actual skewness $\theta$ of the recording surface of the optical disk 14 is illustrated by the graph of FIG. 6.

As mentioned above, although the curvature of the curved surface 228 of the top portion of the detector housing 220 is chosen so that the light exitting the curved surface 228 is in the form of slight-diffused parallel beams 220A and 220B and the focus of the reflected light fA is in front of the light-receiving surfaces of the photo sensors, as shown in chain line in FIG. 3, the reflected image S may also be formed so that the focus fB of the reflected light falls behind the light-receiving surface of the photo sensors 222 and 224.

As mentioned above, the reflected image S is not focussed on the photo-receivers. In the case of an optical disk, the detector will thus not be influenced by concave-convex pit information recorded on the surface of the disk or by light reflected from the surfaces between tracks and the like, and so it resembles a d.c. signal component, whereby it has the advantage that the detection signal circuitry can be simpler than in the prior art.

Furthermore, it is designed so that the optical axis of the emitted light and the reflected light pass through the center of the curved surface 228, whereby changes in the inclination detection sensitivity due to up-and-down motion, which tends to occur in cases where the reflecting surface is an optical disc or the like, can be suppressed.

Accordingly, as the above-mentioned conventional example, it is very effective when mounted on a optical pick-up assembly 12 and utilized in a tracking servo-mechanism.

Figure 7:
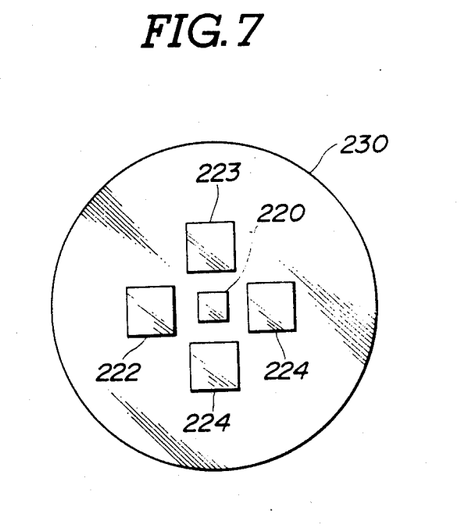
FIG. 7 is an explanatory illustration showing a modification of the preferred embodiment of the skew detector according to the invention.

In the aforementioned preferred embodiment, a pair of photo sensors 222 and 224 are used; however, any number of photo sensors can be mounted radially symmetrically around the light source 2 so as to provide more precise skew detecting ability. For example, as shown in FIG. 7, additional photo sensors 223 and 225 can be provided in mutually symmetrical relationship with respect to the light source.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A reflection-type skewness detector for detecting the skewness of an object relative to a normal orientation of the object comprising:
   a diffused light source;
   a pair of photo detectors arranged on both sides of said diffused light source, said diffused light source and said pair of photo detectors being mounted on a common base; and
   a transparent protector covering said base, an upper portion of said transparent protector having a curved surface refracting the light emitted by said diffused light source into a bundle of substantially parallel light, whereby the light emitted by said light source and reflected from said object is directed to said photo detectors through the upper portion of said transparent protector, said curved surface having a shape to form a substantially circular reflected light image around said diffused light source, and a difference between amounts of light detected by said pair of photo detectors represents the skewness of said object.

2. A reflection-type skewness detector as set forth in claim 1, wherein said object has a substantially flat, light-reflective surface which, when not skewed, lies perpendicular to the optical axis of said skewness detector.

3. A reflection-type skewness detector as set forth in claim 1, wherein said pair of photo detectors are arranged radially symmetrically about said diffused light source.

4. A reflection-type skewness detector as set forth in claim 1, with said circular reflected light image being shifted relative to said diffused light source to an extent related to the skewness of said object.

5. A reflection-type skewness detector as set forth in claim 4, wherein said photo detectors are arranged around said diffused light source so as to receive equal amounts of light when said object is in a desired normal position in which it is not skewed.

6. A reflection-type skewness detector as set forth in claim 1, wherein said transparent protector is made of a synthetic resin by molding and said resin encapsulates said diffused light source and said photo detectors.

7. A reflection-type skewness detector as set forth in claim 2, wherein said object is an optical disk having a recording surface containing information recorded on tracks, which recording surface serves as said light-reflecting surface.

8. A reflection-type skewness detector for detecting the skewness of an object with respect to a desired normal orientation;
   a detector base;
   a diffused light source mounted on said detector base and emitting diffused light toward the opposing surface of said object;
   refracting means interposed between said diffused light source and said surface of said object and substantially aligned therewith for refracting the diffused light emitted by said diffused light source into a parallel light flux directed toward said surface of said object, said refracting means including a curved surface for further refracting light flux reflected by said surface so as to form a circular light image around said diffused light source, said light image being centered at the center of said diffused light source as long as said object is in said normal orientation, said center of said light image being offset to an extent corresponding to the skewness of said object relative to said normal orientation; and
   photo detector means mounted on said base and arranged around said diffused light source for measuring the offset of said center of said light image and producing a detector signal indicative of the extent of skewness of said object relative to said normal orientation.

9. A reflection-type skewness detector as set forth in claim 8, wherein said photo detector means comprises a plurality of photo detectors arranged equidistant around said diffused light source.

10. A reflection-type skewness detector as set forth in claim 9, wherein said photo detectors are arranged to receive equal amounts of reflected light while said object is in said normal orientation.

11. A reflection-type skewness detector as set forth in claim 8, wherein said refracting means comprises a transparent light refractive member the optical axis of which is essentially perpendicular to said surface of said object.

12. A reflection-type skewness detector as set forth in claim 11, wherein said refractive member also serves as a detector housing for said diffused light source and said photo detector means.

13. A reflection-type skewness detector as set forth in claim 12, wherein said detector housing is made of a transparent synthetic resin and said resin encapsulates said diffused light source and said photo-detector means.

14. A reflection-type skewness detector as set forth in claim 13, wherein said photo detector means comprises a plurality of photo detectors arranged equidistant around said diffused light source.

15. A reflection-type skewness detector as set forth in claim 14, wherein said photo detectors are arranged to receive equal amounts of reflected light while said object is in said normal orientation.

16. A reflection-type skewness detector as set forth in claim 15, wherein said photo detectors are arranged radially symmetrically about said diffused light source.

17. A reflection-type skewness detector as set forth in claim 16, wherein said object has a substantially flat, light-reflective surface which, when not skewed, lies perpendicular to the optical axis of said skewness detector.

18. A reflection-type skewness detector as set forth in claim 17, wherein said object is an optical disk having a recording surface containing information recorded on tracks, which recording surface serves as said light-reflecting surface.

19. In an optical information reproducing apparatus for reproducing information recorded on a recording surface of a disk-shaped recording medium, which apparatus includes an optical pick-up device mounted on a tilted optical head block and having an optical axis, a laser beam source for transmitting a laser beam directed along said optical axis toward said recording surface and thereby reading the recorded information, a skewness detector mounted on said tiltable optical head block for detecting the skewness of said recording medium relative to a normal orientation, and a skewness corrector controlled by an output of said skewness detector for controlling said optical head block so that the optical axis of said pick-up device is held perpendicular to said recording surface, said skewness detector comprising:
   a diffused light source;
   a pair of photo detectors arranged on both sides of said diffused light source, said diffused light source and said pair of photo detectors being mounted on a common base; and
   a transparent protector covering said base, an upper portion of said transparent protector having a curved surface for refacting the light emitted by said diffused light source into substantially parallel light beams, whereby the light emitted by said light source and reflected from said object is directed to said photo detectors through the upper portion of said transparent protector, said curved surface having a shape to form a substantially circular reflected light image around said diffused light source, and the difference between the amounts of light detected by said two photo detectors represents the skewness of said object.

20. A skewness detector as set forth in claim 19, wherein said pair of photo detectors are arranged radially symmetrically about said diffused light source.

21. A skewness detector as set forth in claim 19, wherein said circular reflected light image is shifted relative to said diffused light source to an extent related to the skewness of said object.

22. A skewness detector as set forth in claim 21, wherein said photo detectors are arranged around said diffused light source so as to receive equal amounts of light when said object is in a desired normal position in which it is not skewed.

23. A skewness detector as set forth in claim 1, wherein said transparent protector is made of a synthetic resin by molding and said resin encapsulates said diffused light source and said photo-detectors.

24. An optical information reproducing apparatus for reproducing information recorded on a recording surface of a disk-shaped recording medium, comprising:

an optical pick-up device mounted on a tiltable optical head block and having an optical axis;

a laser beam source for transmitting a laser beam along said optical axis toward said recording surface and thereby reading the recorded information;

a skewness detector for detecting the skewness of said recording medium with respect to desired normal orientation thereof, which skewness detector includes:

a detector base;

a diffused light source mounted on said detector base and emitting diffused light toward the opposing surface of said object;

refracting means interposed between said diffused light source and said surface of said object and substantially aligned therewith for refracting the diffused light emitted by said diffused light source into a parallel light flux directed toward said surface of said object, said refracting means including a curved surface for further refracting light flux reflected by said surface so as to form a circular light image around said diffused light source, said light image being centered at the center of said diffused light source as long as said object is in said normal orientation, said center of said light image being offset to an extent corresponding to the skewness of said object relative to said normal orientation;

photo detector means mounted on said base and arranged around said diffused light source for measuring the offset of said center of said light image and producing a detector signal indicative of the extent of skewness of said object relative to said normal orientation; and a servo mechanism for adjusting the angular position of said optical head block based on the output of said skewness detector so that the optical axis of said pick-up device is held perpendicular to said recording surface.

25. An optical information reproducing apparatus as set forth in claim 24, wherein said photo detector means comprises a plurality of photo detectors arranged equidistant around said diffused light source.

26. An optical information reproducing apparatus as set forth in claim 25, wherein said photo detectors are arranged to receive equal amounts of reflected light while said object is in said normal orientation.

27. An optical information reproducing apparatus as set forth in claim 25, wherein said refracting means comprises a transparent light refractive member the optical axis of which is essentially perpendicular to said surface of said object.

28. An optical information reproducing apparatus as set forth in claim 27, wherein said refractive member also serves as a detector housing for said diffused light source and said photo detector means.

29. An optical information reproducing apparatus as set forth in claim 28, wherein said detector housing is made of a transparent synthetic resin and said resin encapsulates said diffused light source and said photo detectors.

30. An optical information reproducing apparatus as set forth in claim 29, wherein said photo detectors are arranged radially symmetrically about said diffused light source.

* * * * *

UNITED STATES PATENT AND TRADEMARK OFFICE
CERTIFICATE OF CORRECTION

PATENT NO. : 4,779,256
DATED : October 18, 1988
INVENTOR(S) : Shigeaki Koike and Akio Yamakawa It is certified that error appears in the above-identified patent and that said Letters Patent is hereby corrected as shown below:

Front page , in References Cited, U.S. Patent Documents, Change "4,680,244" to --4,680,744--;
same page, in patent "4,356,392" change the name "Wottekoek" to --Wittekoek--.
Column 4, line 2, delete ",".

IN CLAIMS

Column 10, line 39, change "refacting" to --refracting--.

Signed and Sealed this

Eighteenth Day of April, 1989

Attest:

DONALD J. QUIGG

Attesting Officer

Commissioner of Patents and Trademarks